(12) United States Patent
Reed

(10) Patent No.: US 12,548,846 B2
(45) Date of Patent: Feb. 10, 2026

(54) POWER SYSTEMS COMPRISING BATTERY ARRAYS

(71) Applicant: Christopher Alen Reed, Soquel, CA (US)

(72) Inventor: Christopher Alen Reed, Soquel, CA (US)

( * ) Notice: Subject to any disclaimer, the term of this patent is extended or adjusted under 35 U.S.C. 154(b) by 248 days.

(21) Appl. No.: 17/699,104

(22) Filed: Mar. 19, 2022

(65) Prior Publication Data

US 2022/0344767 A1  Oct. 27, 2022

Related U.S. Application Data

(60) Provisional application No. 63/179,496, filed on Apr. 25, 2021.

(51) Int. Cl.
*H01M 50/298* (2021.01)
*H01M 10/42* (2006.01)

(52) U.S. Cl.
CPC ....... *H01M 50/298* (2021.01); *H01M 10/425* (2013.01)

(58) Field of Classification Search
CPC .......................... H01M 50/298; H01M 10/425
See application file for complete search history.

(56) References Cited

U.S. PATENT DOCUMENTS

| | | | |
|---|---|---|---|
| 6,452,553 B1 | 9/2002 | Cohen | |
| 8,573,797 B2 * | 11/2013 | Spartano | H05B 45/335 362/418 |
| 2010/0261048 A1 * | 10/2010 | Kim | H02J 7/0063 429/150 |
| 2020/0127470 A1 * | 4/2020 | Botts | B60T 8/17 |

OTHER PUBLICATIONS

Maksimovic, Zane, & Erickson. (May 2004). Impact of digital control in power electronics. In 2004 Proceedings of the 16th International Symposium on Power Semiconductor Devices and ICs (pp. 13-22). IEEE. (Year: 2004).*
Dykhuis, "'Self-Similar' More Objective Than One Might Think," Association of Corporate Counsel, Jun. 9, 2022, retrieved from URL: https://www.lexology.com/library/detail.aspx?g=ca76b94f-24ce-4870-b6ed-9175ffd64bf6&utm_source=Lexology+Daily+Newsfeed&utm_medium=HTM%E2%80%A6, in 2 pages.

* cited by examiner

*Primary Examiner* — Milton I Cano
*Assistant Examiner* — Albert Michael Hilton
(74) *Attorney, Agent, or Firm* — Knobbe, Martens, Olson & Bear, LLP

(57) ABSTRACT

Battery arrays comprising batteries with voltages in deterministic fractal relationships with one another as well as systems to control the power from the battery arrays are disclosed. The battery arrays include systems where one of the batteries in the battery array is a subarray wired identically and controlled analogously to the original primary array.

18 Claims, 2 Drawing Sheets

POWER SYSTEMS COMPRISING BATTERY ARRAYS

BACKGROUND

Many high energy battery powered systems such as electric cars use identical battery cells in an array. However, such systems often require variable voltage and power levels. Each battery has an optimal power and voltage range and a battery that is required to operate outside these optimal ranges can be damaged over time. Currently available solutions to keeping batteries within optimal ranges involve pulse width modulators and other mechanisms to optimize the single nominal battery power level (known voltage with known resistance of the battery) or power draw from the battery so that it can do work (e.g turning the wheels of an electric car) with minimal damage to the battery. Similarly, recharging is inefficient when the array of batteries is fully exhausted and there is some variability in voltage and power from various power sources to charge the battery array.

Electrical systems that depend on pulse width modulation to transfer power from a battery with a fixed voltage to a device that optimally consumes some other voltage are suboptimal. Charging systems suffer from similar issues that can potentially damage the batteries. These systems all share a characteristic that they have an operating frequency with a fundamental period at which the voltage switches on and off, resulting in a voltage transfer that differs the voltage of the battery itself. This periodic switching has inherent problems in terms of harmonics as well as producing suboptimal on-off speeds, spikes, etc. Well known disadvantages of pulse width modulation include: complexity of the circuit, voltage spikes, the requirement of an expensive semiconductor device with low turn ON and turn OFF times, radiofrequency interference, electromagnetic noise, high switching loss due to high PWM frequency, and varying transmitter power.

SUMMARY

Disclosed herein is a system that includes a battery array and controller where the individual battery cells have different voltages that are configured such that the system can draw power from the individual batteries in a way that approximates a demand curve (for voltage and/or power) for a particular load. In many systems (e.g. electric cars) the demand curve changes frequently throughout use and therefore desired voltage and/or power levels are not limited to a discrete load level or a power level that can be met by multiple batteries of the same voltage. The disclosed system, comprises multiple batteries of different voltages connected by wired connections and switches and controlled by software that opens and closes the switches in a pattern such that the load can draw power in a manner that is rapidly approximated to match a variable load curve. To the degree that the load curve has elements of plateau like levels based on the harmonics of the load, the disclosed array can be reconfigured to match any particular motor harmonics. The disclosed system is optimized to get the best fit to the curve, with the least number of connectors to connect batteries in series and to minimize the step size.

Disclosed herein is a power system that includes: a first battery with a first voltage; a second battery with a second voltage, where the second voltage is greater than the first voltage; and a third battery with a third voltage, where the third voltage is greater than the second voltage. The power system also comprises a first wired connection that connects the cathode of the first battery with the anode of the second battery, a second wired connection that connects the cathode of the first battery with the anode of the third battery, a third wired connection that connects the anode of the first battery with the load; a fourth wired connection that connects the cathode of the first battery with the load; a fifth wired connection that connects the cathode of the second battery with the anode of the third battery; a sixth wired connection that connects the cathode of the second battery with the load; a seventh wired connection that connects the anode of the second battery with the load; an eighth wired connection that connects the cathode of the third battery with the load; a ninth wired connection that connects the anode of the third battery with the load; the first, second, third, fourth, fifth, sixth, seventh, eighth, and ninth wired connections each comprising a switch; and a controller that moves each switch from an open to a closed position to provide a desired power level to the load.

In an embodiment, the first wired connection comprises a first switch, the fifth wired connection comprises a second switch, the eighth wired connection comprises a third switch, the sixth wired connection comprises a fourth switch, the seventh wired connection comprises a fifth switch, the third wired connection comprises a sixth switch, the ninth wired connection comprises a seventh switch, the fourth wired connection comprises an eighth switch and the second wired connection comprises a ninth switch; where closing the sixth switch and seventh switch results in a first power level; where closing the fourth and fifth switches results in a second power level greater than the first power level; where closing the first, fourth and sixth switches results in a third power level greater than the second power level; where closing the third and seventh switches results in a fourth power level greater than the third power level; where closing the third, sixth, and ninth switches results in a fifth power level greater than the fourth power level where closing the second, third, and fifth results in a sixth power level greater than the fifth power level; and where closing the first, second, third, and sixth switches results in a seventh power level greater than the sixth power level.

In an example of the above embodiment, the first voltage is one volt, the second voltage is two volts, and the third voltage is four volts where the first power level is 1 volt, the second power level is two volts, the third power level is three volts, the fourth power level is four volts, the fifth power level is five volts, the sixth power level is six volts and the seventh power level is seven volts.

In embodiments, the controller opens and closes the switches using a wired or wireless connection.

In further embodiments, the controller further comprises a pulse width modulator connected in series between the positive terminal of the batteries and the load Also disclosed herein is a power system comprising a first battery with a first voltage; a second battery with a second voltage that is greater than the first voltage; and a third battery with a third voltage that is greater than the second voltage.

In an embodiment, at least the first battery and the second battery are connected in parallel.

In another embodiment, at least the first battery and the second battery are connected in series.

In a further embodiment, the first, second, and third batteries form a primary array. In an example, the primary array is wired identically to the system described above.

In a still further embodiment, at least one of the first battery, second battery, and third battery comprises a subarray, the subarray comprising at least a first sub-battery with a fourth voltage, a second sub-battery with a fifth voltage greater than the fourth voltage, and a third sub-battery with a sixth voltage greater than the fifth voltage. The subarray is wired identically to the primary array, thereby forming a deterministic fractal relationship with the primary array and comprising a controller that moves each switch from an open to a closed position to provide a desired power level to a load.

In another embodiment, the total voltage of at least the first battery, second battery or third battery is determined by the expression x+2x+4x, where x is the fourth voltage, 2x is the fifth voltage, and 4x is the sixth voltage.

In an example of the above embodiment, the first voltage is 1V, the second voltage is 2V, the third voltage is 4V, the fourth voltage is 4/7 V, the fifth voltage is 8/7 V, and the sixth voltage is 16/7 V.

DETAILED DESCRIPTION

The disclosed power system includes a primary array comprising a first battery, a second battery, and a third battery. The voltage of the second battery is greater than that of the first battery. The voltage of the third battery is greater than the second battery. The array can comprise additional batteries of higher voltages. Such an array of batteries is wired such that a battery management system can open and close switches and thereby vary the power level in a way that creates a smoother trajectory. Preferably the number of the batteries and the number of connectors between the batteries is optimized to best approximate a load curve. This system can be used without a pulse width modulator. It can also be used in combination with a pulse width modulator in a way that allows for a smaller, less expensive, or lower or higher frequency, lower power, etc. pulse width modulator for a given power requirement.

In mathematics, more specifically in fractal geometry, a deterministic fractal relationship is a ratio providing a statistical index of complexity comparing how detail in a fractal pattern changes with the scale at which it is measured. It has also been characterized as a measure of the space-filling capacity of a pattern that tells how a fractal scales differently from the space it is embedded in; a fractal dimension does not have to be an integer.

As described herein, a battery is any power source that converts chemical energy into electricity. All batteries comprise a cathode and an anode. The inventor intends to use the plain and ordinary meaning of 'battery' as determined by common usage in the art. A battery array is a power system that uses a plurality of battery cells, including battery cells of different voltages. As described herein, a primary array is a single battery array comprised of battery cells as well as additional battery arrays. A battery array that makes up one of the batteries in a primary array (or primary battery array) is termed a subarray (or sub-array) herein. A battery array of which the primary array is but one battery is termed a superarray herein. Any subarray or superarray is in a deterministic fractal relationship relative to a related primary array. As used herein, a battery array is a subset of the general term 'battery'

Figure 1:
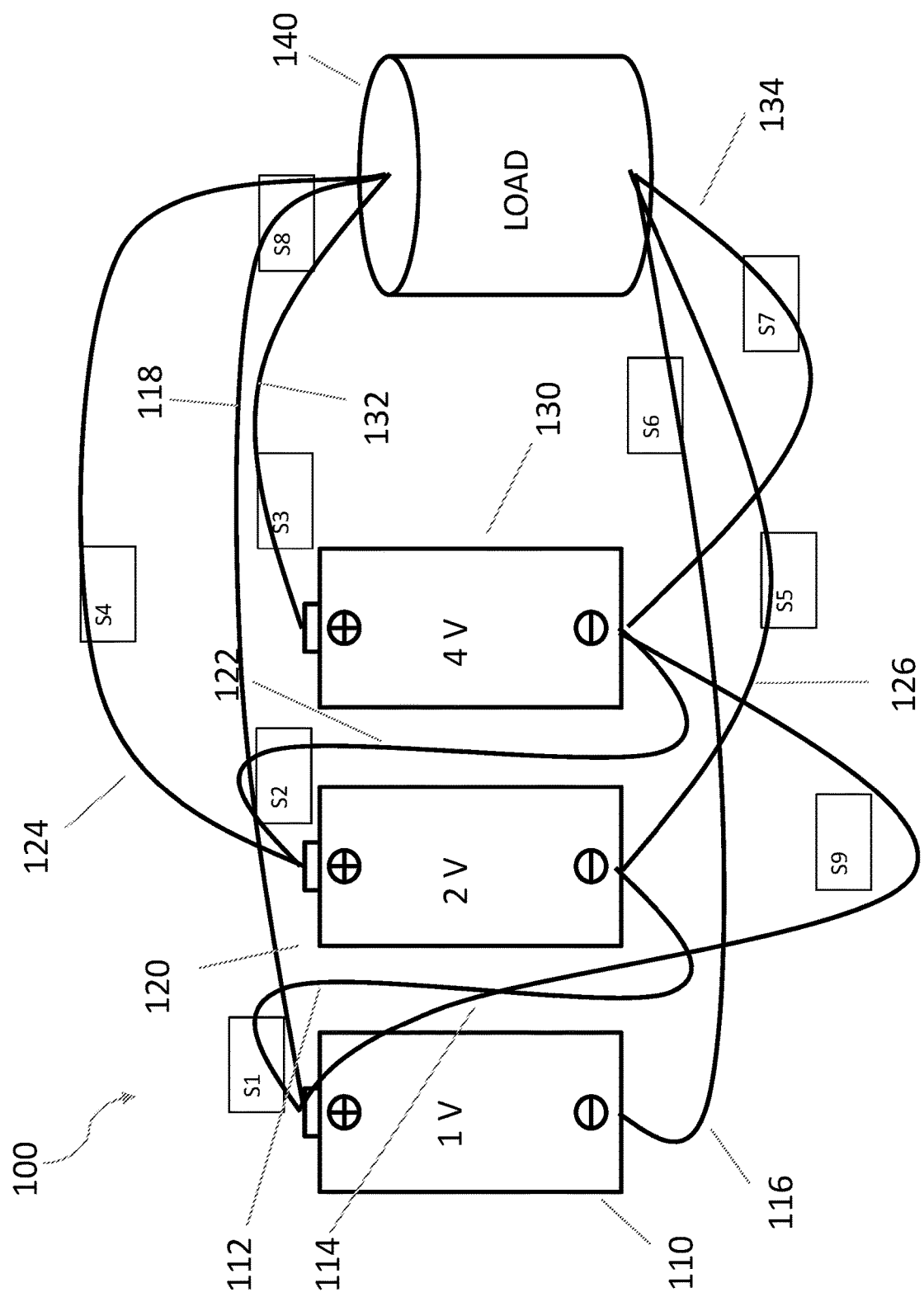
FIG. 1 is an exemplar of an embodiment a primary battery array with three batteries of one, two, and four volts.

Referring now to FIG. 1 which illustrates an exemplary primary battery array 100 where the batteries are connected in series. The array comprises a first battery 110 shown here with a voltage value of 1 volt, a second battery 120 shown here with a voltage of 2 volts, a third battery 130 shown here with a voltage of 4 volts, and a load. The voltages shown here are shown by way of example. One of ordinary skill in the art in light of this disclosure would be able to create this array with different voltage batteries without undue experimentation. The load 140 can be any further system that consumes electrical power such as an electric motor.

A first wired connection 112 connects the cathode of the first battery with the anode of the second battery. A second wired connection 114 connects the cathode of the first battery with the anode of the third battery. A third wired connection 116 connects the anode of the first battery with the load. A fourth wired connection 118 connects the cathode of the first battery with the load. A fifth wired connection 122 connects the cathode of the second battery with the anode of the third battery. A sixth wired connection 124 connects the cathode of the second battery with the load, a seventh wired connection 126 connects the anode of the second battery with the load. An eighth wired connection 132 connects the cathode of the third battery with the load and a ninth wired connection 134 connects the anode of the third battery with the load.

Each wired connection further comprises a switch that can take on an 'open' (O) or 'closed' (C) position with the first switch S1 operably linked to the first wired connection 112, the second switch S2 operably linked to the fifth wired connection 122, the third switch S3 operably linked to the eighth wired connection 132, the fourth switch S4 operably linked to the sixth wired connection 124, the fifth switch S5 operably linked to the seventh wired connection 126, the sixth switch S6 operably linked to the third wired connection 116, the seventh switch S7 operably linked to the ninth wired connection 134, the eighth switch S8 operably linked to the fourth wired connection 118, and the ninth switch S9 operably linked to the second wired connection 114.

The nine switches of the exemplary embodiment of FIG. 1 are switched between an open and closed position by a controller configured to open and close individual switches in response to an amount of power required by the load. Switch positions in the exemplary embodiment of FIG. 1 are shown in Table 1. In the table, for a one-volt power level, switches S6 and S7 are in the closed position and all other switches re in the open position. For a two-volt power level, switches S4 and S5 are closed and all other switches are open. For a three-volt power level, switches S1, S4, and S6 are closed, and all other switches are open For a four-volt power level, switches S3 and S7 are closed and all other switches are open. For a five-volt power level, switches S3, S6, and S9 are closed and all other switches are open. For a six volt power level, switches S2, S3, and S5 are closed and all other switches are open. For a seven volt power level, switches S1, S2, S3, and S6 are closed and all other switches are open.

TABLE 1

|    | 1 V | 2 V | 3 V | 4 V | 5 V | 6 V | 7 V |
|----|-----|-----|-----|-----|-----|-----|-----|
| S1 | O   | O   | C   | O   | O   | O   | C   |
| S2 | O   | O   | O   | O   | O   | C   | C   |

TABLE 1-continued

|    | 1 V | 2 V | 3 V | 4 V | 5 V | 6 V | 7 V |
|----|-----|-----|-----|-----|-----|-----|-----|
| S3 | O | O | O | C | C | C | C |
| S4 | O | C | C | O | O | O | O |
| S5 | O | C | O | O | O | C | O |
| S6 | C | O | C | O | C | O | C |
| S7 | O | O | O | C | O | O | O |
| S8 | C | O | O | O | O | O | O |
| S9 | O | O | O | O | C | O | O |

TABLE 2

|    | 4/7 V | 8/7 V | 12/7 V | 16/7 V | 20/7 V | 24/7 V | 28/7 V |
|----|-------|-------|--------|--------|--------|--------|--------|
| S1 | O | O | C | O | O | O | C |
| S2 | O | O | O | O | O | C | C |
| S3 | O | O | O | C | C | C | C |
| S4 | O | C | C | O | O | O | O |
| S5 | O | C | O | O | O | C | O |
| S6 | C | O | C | O | C | O | C |
| S7 | O | O | O | C | O | O | O |
| S8 | C | O | O | O | O | O | O |
| S9 | O | O | O | O | C | O | O |

In operation, the controller receives a first signal to select a first voltage and positions the switches to correspond to the first voltage. The controller then receives a second signal from the load to select a second voltage different from the first voltage. It then positions the switches to correspond to the second voltage. Preferably, the time gap between the first signal and the second signal is as small as possible. A short time gap allows for smoother waypoints while switching between power levels. The controller can open and close the system using a wired or wireless connection.

In an embodiment the third (e.g. 4V) battery 130 from FIG. 1 is set up as 3 batteries that represent a self-similar system to the whole system shown in FIG. 1. Further the voltages of the 3 internal batteries that make up the third battery are in a deterministic fractal relationship with each other and the expression is 4 V=x+2x+4x where x is the voltage of the first of the three internal batteries that make up the third battery 130, 2x is the voltage of the second battery, and 4x is the voltage of the third and final of the three batteries that make up the third battery 130. Solving for x gives $4/7$ V. So the voltages of the three internal batteries that make up the third battery 130 at 4 volts are $4/7$ V, $8/7$ V, and $16/7$ V. These internal batteries are self similar to the whole system 100. In embodiments, at least one of the first battery 110, second battery 120 or third battery 130 has a structure that is self-similar to the entire power system 100. Such an embodiment is shown in FIG. 2.

Figure 2:
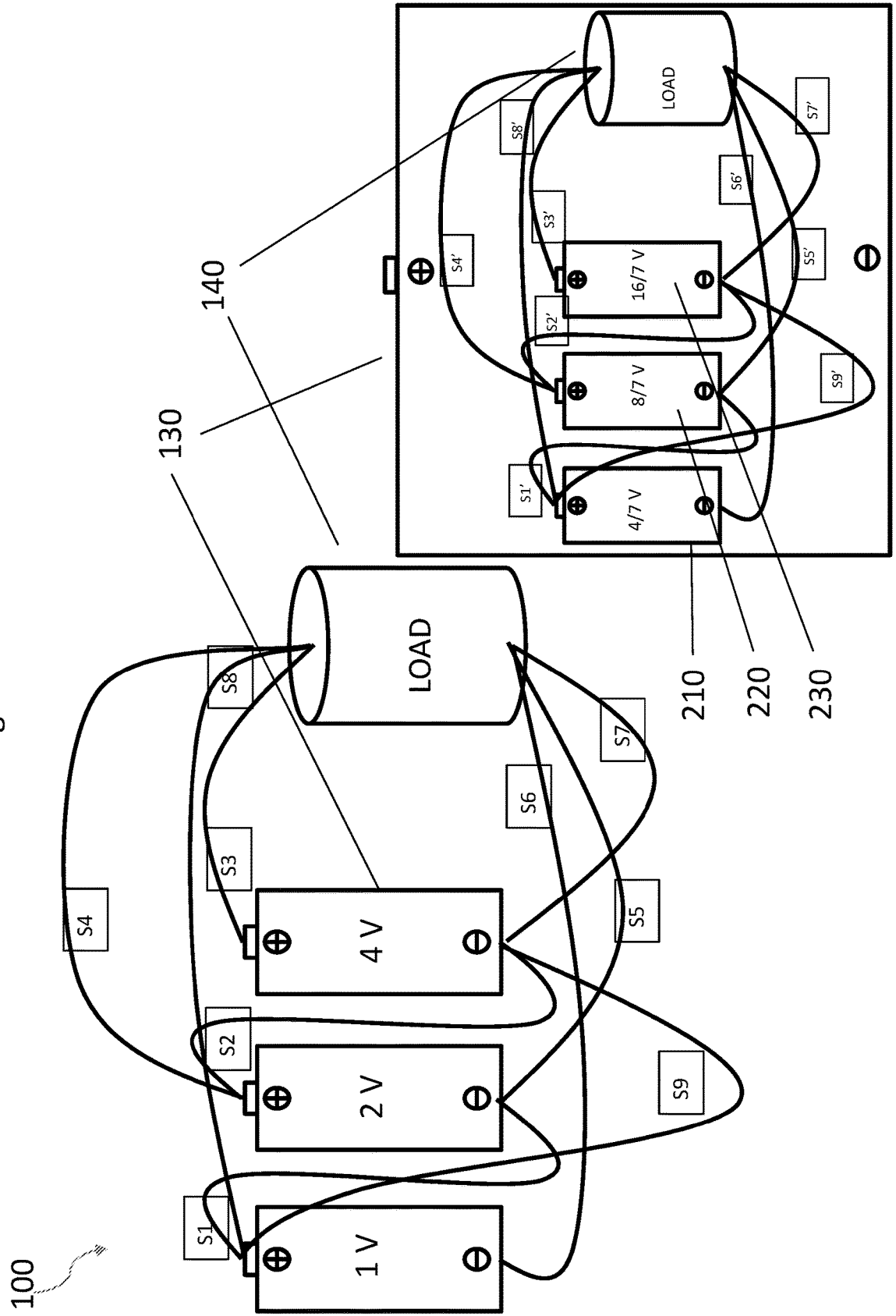
FIG. 2 shows the primary battery array of FIG. 1, but indicating in an inset that the four volt battery in FIG. 1 is a sub-array with batteries of 4/7, 8/7, and 16/7 volts as indicated. The load of the sub-array is the same as the load of the primary array.

Referring now to FIG. 2 which shows a primary battery array 100 identical to the battery array of FIG. 1. FIG. 2 indicates that the third battery 130 in the primary array is a subarray comprising a first sub-battery 210, a second sub-battery 220, a third sub-battery 230, and the load 140. As depicted herein, the primary array and sub array have the same load. As exemplified here, where the third battery 130 is a four-volt battery, the first sub-battery 210 has a voltage of $4/7$ volts, the second sub-battery has a voltage of $8/7$ volts, and the third sub-battery has a voltage of $16/7$ volts. The switches and wiring of the subarray and the selection of switches to yield a desired voltage are otherwise identical to the primary array and therefore the primary array and subarray are in a deterministic fractal relationship.

The subarray may further comprise its own controller configured to operate in the same manner as the controller for the primary array. The subarray controller would be in communication with the primary array controller. Alternatively, the primary array controller is configured to control both the primary array and the subarray. The pattern of opening and closing of switches to yield a desired voltage in the exemplified subarray is shown in Table 2 and is analogous to the pattern of Table 1.

The invention claimed is:

1. A power system comprising:
    a first battery with a first voltage value and comprising a cathode and an anode;
    a second battery with a second voltage value and comprising a cathode and an anode, the second voltage value different than the first voltage value;
    a third battery with a third voltage value and comprising a cathode and an anode, wherein the third voltage value is different than the first voltage value and the second voltage value;
    wherein the first voltage value of the first battery, the second voltage value of the second battery, and the third voltage value of the third battery are in a deterministic fractal relationship with one another;
    a first wired connection that connects the cathode of the first battery with the anode of the second battery;
    a second wired connection that connects the cathode of the first battery with the anode of the third battery;
    a third wired connection that connects the anode of the first battery with a load;
    a fourth wired connection that connects the cathode of the first battery with the load;
    a fifth wired connection that connects the cathode of the second battery with the anode of the third battery;
    a sixth wired connection that connects the cathode of the second battery with the load;
    a seventh wired connection that connects the anode of the second battery with the load;
    an eighth wired connection that connects the cathode of the third battery with the;
    a ninth wired connection that connects the anode of the third battery with the load;
    wherein the first, second, third, fourth, fifth, sixth, seventh, eighth, and ninth wired connections are direct connections configured to be switched by first to ninth respective switches;
    a controller configured to arrange a plurality of switches comprising the first to ninth respective switches in a first arrangement having a first combination of open and closed positions to provide a first selected power level to the load; and
    wherein in response to a change in an amount of power drawn by the load to a second selected power level, the controller is configured to arrange the plurality of switches in a second arrangement having a second combination of open and closed positions to provide a second selected power level to the load.

2. The power system of claim 1,
    wherein the first wired connection comprises the first switch, the fifth wired connection comprises the second switch, the eighth wired connection comprises a third switch, the sixth wired connection comprises the fourth switch, the seventh wired connection comprises the fifth switch, the third wired connection the sixth switch, the ninth wired connection comprises the seventh switch, the fourth wired connection comprises the eighth switch, and the second wired connection comprises the ninth switch,
wherein closing the sixth switch and seventh switch results in a first power level,
wherein closing the fourth and fifth switches results in a second power level greater than the first power level,
wherein closing the first, fourth and sixth switches results in a third power level greater than the second power level,
wherein closing the third and seventh switches results in a fourth power level greater than the third power level,
wherein closing the third, sixth, and ninth switches results in a fifth power level greater than the fourth power level,
wherein closing the second, third, and fifth switches results in a sixth power level greater than the fifth power level, and
wherein closing the first, second, third, and sixth switches results in a seventh power level greater than the sixth power level.

3. The power system of claim 2,
wherein the first voltage value is one volt, the second voltage value is two volts, and the third voltage value is four volts.

4. The power system of claim 1 wherein the controller opens and closes the switches using a wired or wireless connection.

5. The power system of claim 1,
wherein the switches of the fourth, sixth, and eighth wired connection represent a positive terminal; and
wherein the controller further comprises a pulse width modulator connected in series between the positive terminal and the load.

6. A power system comprising:
a plurality of batteries comprising:
a first battery with a first voltage value;
a second battery with a second voltage value;
a third battery with a third voltage value;
wherein the first voltage value of the first battery, the second voltage value of the second battery, and the third voltage value of the third battery are in a deterministic fractal relationship with one another;
wherein each battery of the plurality of batteries is coupled through a plurality of wired connections to one other battery of the plurality of batteries or a load;
wherein a cathode of the first battery, a cathode of the second battery, and a cathode of the third battery are directly connected to a first end of the load through individual wired connections of the plurality of wired connections;
wherein an anode of the first battery, an anode of the second battery, and an anode of the third battery are directly connected to a second end of the load through individual wired connections of the plurality of wired connections;
wherein each of the plurality of wired connections forms a direct connection;
wherein each wired connection comprises at least one switch of a plurality of switches; and
a controller configured to arrange the plurality of switches in a first arrangement having a first combination of open and closed positions to provide a first selected power level to the load;
wherein in response to a signal from the load with a second selected power level, the controller is configured to arrange the plurality of switches in the second arrangement having a second combination of open and closed positions to provide a second selected power level to the load.

7. The power system of claim 6, wherein a total voltage value of at least the first battery, second battery or third battery is determined by the deterministic fractal relationship is represented by expression x+2x+4x, wherein x represents the first voltage value, wherein 2x represents the second voltage value as twice the first voltage value, and wherein 4x represents the third voltage value as four times the first voltage value.

8. The power system of claim 6, wherein the plurality of wired connections comprises connections connecting at least the first battery and the second battery in parallel.

9. The power system of claim 6, wherein the plurality of wired connections comprises connections connecting at least the first battery and the second battery in series.

10. The power system of claim 6, wherein the plurality of wired connections comprises:
a first wired connection that connects the cathode of the first battery with the anode of the second battery;
a second wired connection that connects the cathode of the first battery with the anode of the third battery;
a third wired connection that connects the anode of the first battery with the load;
a fourth wired connection that connects the cathode of the first battery with the load;
a fifth wired connection that connects the cathode of the second battery with the anode of the third battery;
a sixth wired connection that connects the cathode of the second battery with the load;
a seventh wired connection that connects the anode of the second battery with the load;
an eighth wired connection that connects the cathode of the third battery with the load;
a ninth wired connection that connects the anode of the third battery with the load; and
the first, second, third, fourth, fifth, sixth, seventh, eighth, and ninth wired connections each comprising a switch of the plurality of switches.

11. The power system of claim 6, wherein at least one of the first
battery, second battery, and third battery comprises a subarray, the subarray comprising at least a first sub-battery with a fourth voltage value, a second sub-battery with a fifth voltage value, and a third sub-battery with a sixth voltage value and wherein a subarray relationship represents that the fifth voltage value is greater than the fourth voltage value and that the sixth voltage value is greater than the fifth voltage value.

12. The power system of claim 11, wherein a total voltage value of at least the first sub-battery, second sub-battery, and third sub-battery is determined by the subarray relationship, wherein the subarray relationship is represented by expression y+2y+4y, wherein y represents the fourth voltage value, 2y represents the fifth voltage value as two times the fourth voltage value, and wherein 4y represents the sixth voltage value as four times the fourth voltage value.

13. The power system of claim 6,
wherein at least one of the first battery, second battery, and third battery comprises a subarray, the subarray comprising a plurality of sub-batteries;
wherein the plurality of sub-batteries comprises a first sub-battery with a fourth voltage value, a second sub-battery with a fifth voltage value, and a third sub-battery with a sixth voltage value and wherein the fifth voltage value is greater than the fourth voltage value; wherein the sixth voltage value is greater than the fifth voltage value; and wherein each of the plurality of sub-batteries is connected to at least one of another sub-battery of the plurality of sub-batteries or the load through a wired connection of the plurality of wired connections.

14. The power system of claim 13, wherein the controller opens or closes each switch of the plurality of switches using a wireless or wired connection.

15. The power system of claim 13, wherein the first voltage value is 1V, the second voltage value is 2V, the third voltage value is 4V, the fourth voltage value is 4/7 V, the fifth voltage value is 8/7 V, and the sixth voltage value is 16/7 V.

16. The power system of claim 1, wherein the first to third batteries are arranged as a primary array, wherein one of the first to third batteries comprises first to third sub-batteries arranged as a subarray, the subarray further comprising first to ninth wired sub-connections and a plurality of sub-switches.

17. The power system of claim 16, wherein in response to the change in the amount of power drawn by the load to the second selected power level, the controller is further configured to arrange the plurality of sub-switches into a sub-switch arrangement of open and closed switch positions that corresponds to the second arrangement.

18. The power system of claim 17, wherein the sub-switch arrangement is such that a relative voltage relationship between the first to third batteries is the same as a relative voltage relationship between the first to third sub-batteries.

* * * * *